(12) United States Patent
Fujino

(10) Patent No.: US 12,365,959 B2
(45) Date of Patent: Jul. 22, 2025

(54) OIL RING WIRE

(71) Applicant: TOKUSEN KOGYO CO., LTD., Ono (JP)

(72) Inventor: Miho Fujino, Kobe (JP)

(73) Assignee: TOKUSEN KOGYO CO., LTD., Hyogo (JP)

( * ) Notice: Subject to any disclaimer, the term of this patent is extended or adjusted under 35 U.S.C. 154(b) by 0 days.

(21) Appl. No.: 18/274,772

(22) PCT Filed: Dec. 27, 2021

(86) PCT No.: PCT/JP2021/048636
§ 371 (c)(1),
(2) Date: Jul. 28, 2023

(87) PCT Pub. No.: WO2022/219853
PCT Pub. Date: Oct. 20, 2022

(65) Prior Publication Data
US 2024/0093325 A1 Mar. 21, 2024

(30) Foreign Application Priority Data
Apr. 12, 2021 (JP) .................. 2021-067234

(51) Int. Cl.
| | |
|---|---|
| *C22C 38/04* | (2006.01) |
| *C21D 1/18* | (2006.01) |
| *C21D 6/00* | (2006.01) |
| *C21D 8/00* | (2006.01) |
| *C21D 9/40* | (2006.01) |
| *C22C 38/34* | (2006.01) |
| *C22C 38/42* | (2006.01) |
| *C22C 38/46* | (2006.01) |
| *F16J 9/26* | (2006.01) |

(52) U.S. Cl.
CPC ............ *C21D 9/40* (2013.01); *C21D 1/18* (2013.01); *C21D 6/004* (2013.01); *C21D 6/005* (2013.01); *C21D 6/008* (2013.01); *C21D 8/005* (2013.01); *C22C 38/04* (2013.01); *C22C 38/34* (2013.01); *C22C 38/42* (2013.01); *C22C 38/46* (2013.01); *F16J 9/26* (2013.01)

(58) Field of Classification Search
CPC .................. C22C 38/04; C22C 38/34
USPC .......................................... 428/600
See application file for complete search history.

(56) References Cited

FOREIGN PATENT DOCUMENTS

| | | | | |
|---|---|---|---|---|
| EP | 3006787 A1 | * | 4/2016 | ............... B21H 1/06 |
| JP | 2007092843 A | * | 4/2007 | |

(Continued)

OTHER PUBLICATIONS

Masuda et al., JP2018062690A Google Patents Machine translation and human translation of Table 4, both of Oct. 22, 2024, Apr. 19, 2018, entire translation (Year: 2018).*

(Continued)

*Primary Examiner* — Katherine A Christy
(74) *Attorney, Agent, or Firm* — Sughrue Mion, PLLC

(57) ABSTRACT

An oil ring wire (2) containing an alloy steel as a material. The alloy steel contains: 0.50 to 0.65% by mass C; 1.60 to 2.30% by mass Si; 0.60 to 1.10% by mass Mn; 0.75 to 1.15% by mass Cr; 0.18 to 0.45% by mass Ni; 0.05 to 0.15% by mass V; and 0.15% by mass or less Cu. In the oil ring wire 2, an area percentage of a carbide is 1.00% or less. Also disclosed is a method of producing the oil ring wire.

4 Claims, 8 Drawing Sheets

(56) References Cited

FOREIGN PATENT DOCUMENTS

| JP | 2008-50649 A | | 3/2008 |
|---|---|---|---|
| JP | 2018062690 A | * | 4/2018 |

OTHER PUBLICATIONS

Karaoke et al., JP-2007092843-A Google Patents Machine translation of Oct. 22, 2024, Apr. 12, 2007, entire translation (Year: 2007).*

* cited by examiner

OIL RING WIRE

CROSS REFERENCE TO RELATED APPLICATIONS

This application is a National Stage of International Application No. PCT/JP2021/048636 filed Dec. 27, 2021, claiming priority based on Japanese Patent Application No. 2021-067234 filed Apr. 12, 2021.

TECHNICAL FIELD

The present invention relates to a wire for an oil ring mounted on a piston of an internal combustion engine. In particular, the present invention relates to a wire suitable, for example, for a side rail of a three-piece combined oil ring.

BACKGROUND ART

An internal combustion engine includes a cylinder, a piston, a pressure ring, and an oil ring. The pressure ring and the oil ring are mounted on the piston. The pressure ring and the oil ring are collectively referred to as "piston rings". An example of the piston rings is disclosed in Japanese Laid-Open Patent Application Publication No. 2008-50649.

Upon movement of the piston, the oil ring also moves in the cylinder. By this movement, the oil ring scrapes off an oil adhering to the inner circumferential face of the cylinder. The oil returns to an oil pan.

Oil rings are broadly classified into two-piece combined oil rings and three-piece combined oil rings. A three-piece combined oil ring includes a spacer expander and a pair of side rails. Each of the side rails includes an edge portion. The edge portion rubs against the inner circumferential face of a cylinder.

A side rail whose material is a stainless steel is in widespread use. The side rail has been subjected to nitriding. The surface of the side rail is hard. The nitriding contributes to the wear resistance of the side rail.

A side rail whose material is a carbon steel or low-alloy steel is in widespread use. Carbon steels and low-alloy steels have excellent workability. Thus, the side rail can easily be obtained. The side rail has a hard coat. The hard coat can be formed by plating (or coating). The hard coat contributes to the wear resistance of the side rail.

CITATION LIST

Patent Literature

PTL 1: Japanese Laid-Open Patent Application Publication No. 2008-50649

SUMMARY OF INVENTION

Technical Problem

A side rail whose material is a stainless steel requires a high material cost. Stainless steels have poor workability. The production of the side rail made of a stainless steel is not easy.

A side rail whose material is a common carbon steel or low-alloy steel is not suitable for nitriding. Thus, the side rail is plated or coated as mentioned above. The plating entails costs such as that for liquid waste treatment. The coating involves a heating step, and the heating causes softening of the side rail.

An object of the present invention is to provide a wire by the use of which a low-cost oil ring having excellent wear resistance can be obtained.

Solution to Problem

An oil ring wire according to the present invention contains an alloy steel as a material.

The alloy steel contains:
0.50 to 0.65% by mass C;
1.60 to 2.30% by mass Si;
0.60 to 1.10% by mass Mn;
0.75 to 1.15% by mass Cr;
0.18 to 0.45% by mass Ni;
0.05 to 0.15% by mass V;
0.15% by mass or less Cu; and
inevitable impurities.

In the oil ring wire, an area percentage of a carbide is 1.00% or less.

Preferably, the oil ring wire has a Vickers hardness of 530 to 650.

The oil ring wire may include a rounded edge portion. Preferably, the edge portion has a radius of curvature R of 0.07 mm or less in a cross-section perpendicular to a longitudinal direction of the oil ring wire.

In another aspect, a method of producing an oil ring wire according to the present invention includes:

(1) subjecting a basic wire to cold wire drawing and patenting to obtain a thin wire, the basic wire containing an alloy steel as a material, the alloy steel containing 0.50 to 0.65% by mass C, 1.60 to 2.30% by mass Si, 0.60 to 1.10% by mass Mn, 0.75 to 1.15% by mass Cr, 0.18 to 0.45% by mass Ni, 0.05 to 0.15% by mass V, 0.15% by mass or less Cu, and inevitable impurities;

(2) subjecting the thin wire to rolling or deformed wire drawing as cold working to obtain a deformed wire; and (3) subjecting the deformed wire to quenching and tempering.

Advantageous Effects of Invention

The alloy steel used as the material of the oil ring wire according to the present invention is inexpensive. The alloy steel has excellent workability. Additionally, the oil ring wire is suitable for nitriding, and this eliminates the need for plating of a side rail or the like obtained from the wire. Thus, an oil ring can be obtained at a low cost.

The oil ring wire exhibits excellent softening resistance during heating. Thus, a side rail or the like obtained from the wire through a heat treatment has high hardness. The oil ring has excellent wear resistance.

DESCRIPTION OF EMBODIMENTS

The following will describe the present invention in detail based on preferred embodiments with appropriate reference to the drawings.

Figure 1:
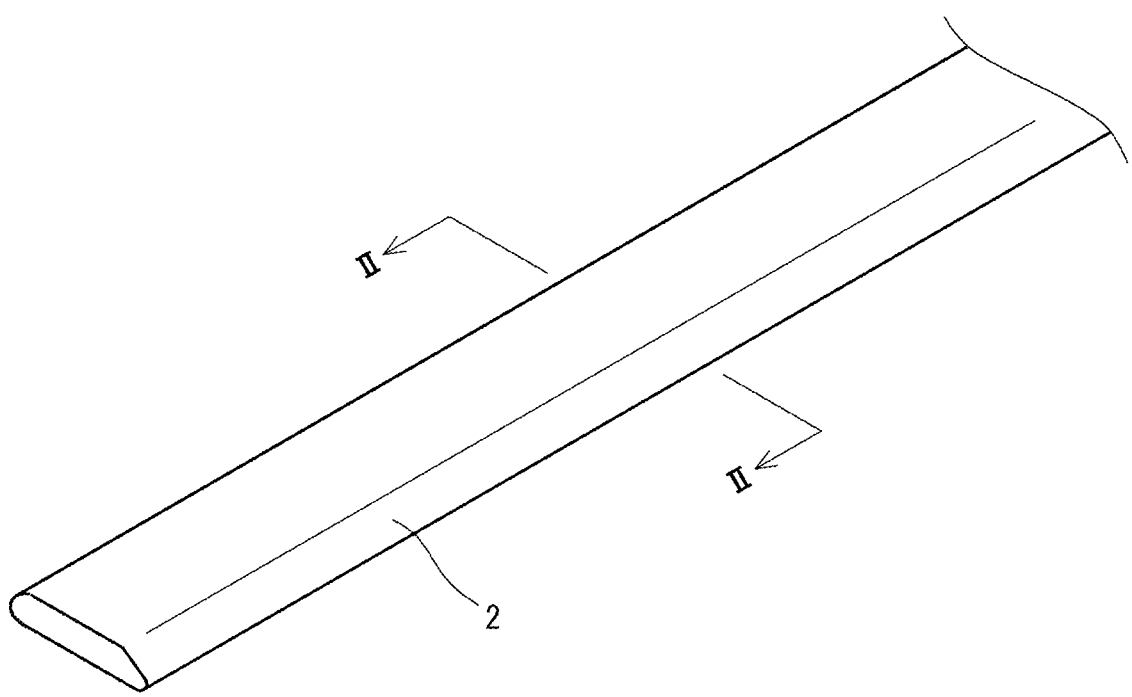
FIG. 1 is a perspective view showing a part of an oil ring wire according to one embodiment of the present invention.
Figure 2:
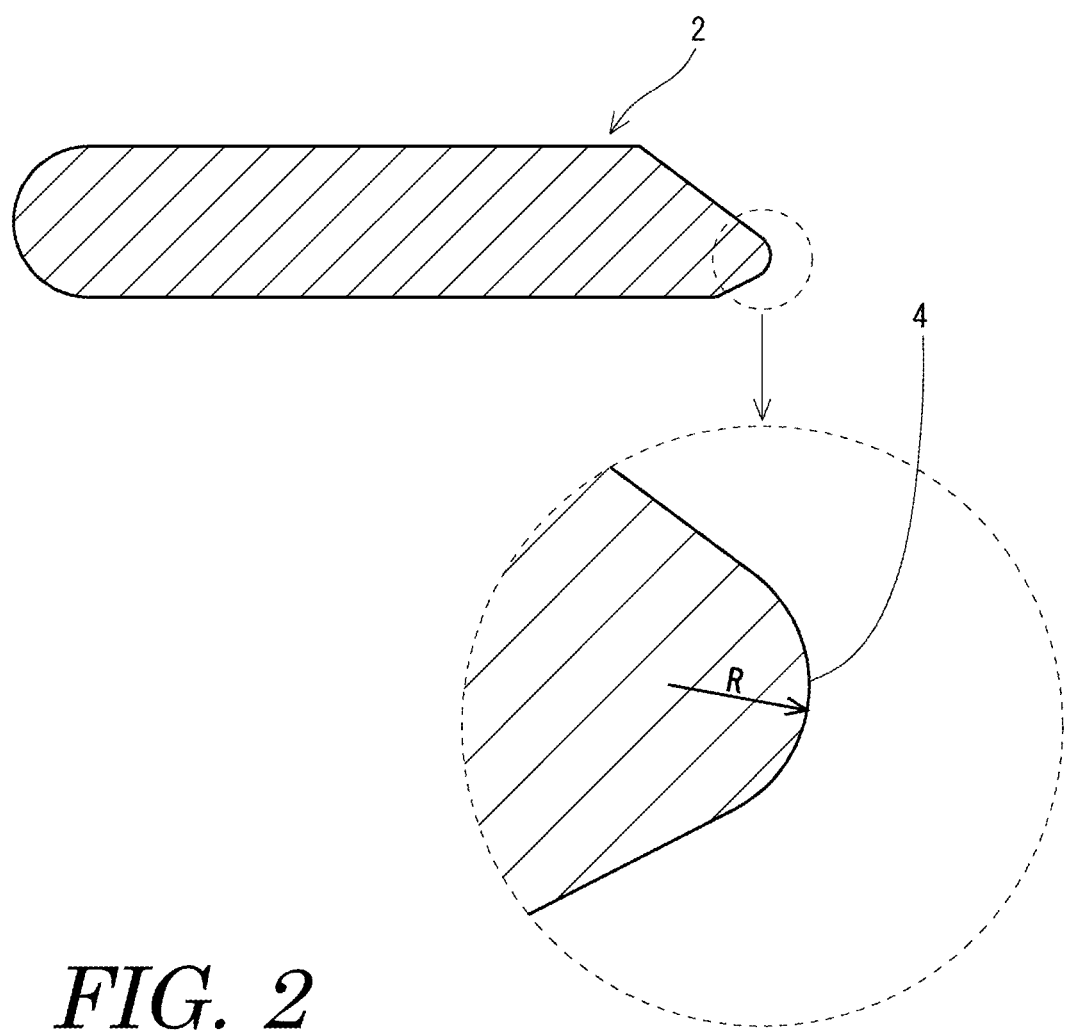
FIG. 2 is an enlarged cross-sectional view taken along the line II-II of FIG. 1.

FIGS. 1 and 2 show an oil ring wire 2. The cross-sectional shape of the oil ring wire 2 is not a circle. In other words, the oil ring wire 2 is a deformed wire. As shown in FIG. 2, the oil ring wire 2 includes an edge portion 4. The edge portion 4 is formed by corner rounding.

The oil ring wire 2 contains an alloy steel as a material. The alloy steel contains: 0.50 to 0.65% by mass C; 1.60 to 2.30% by mass Si; 0.60 to 1.10% by mass Mn; 0.75 to 1.15% by mass Cr; 0.18 to 0.45% by mass Ni; 0.05 to 0.15% by mass V; and 0.15% by mass or less Cu. Preferably, the rest of the alloy steel consists of Fe and inevitable impurities. The amount of the alloy elements contained in the alloy steel is relatively small. The material of the oil ring wire 2 is a low-alloy steel. The low-alloy steel is inexpensive.

Figure 3:
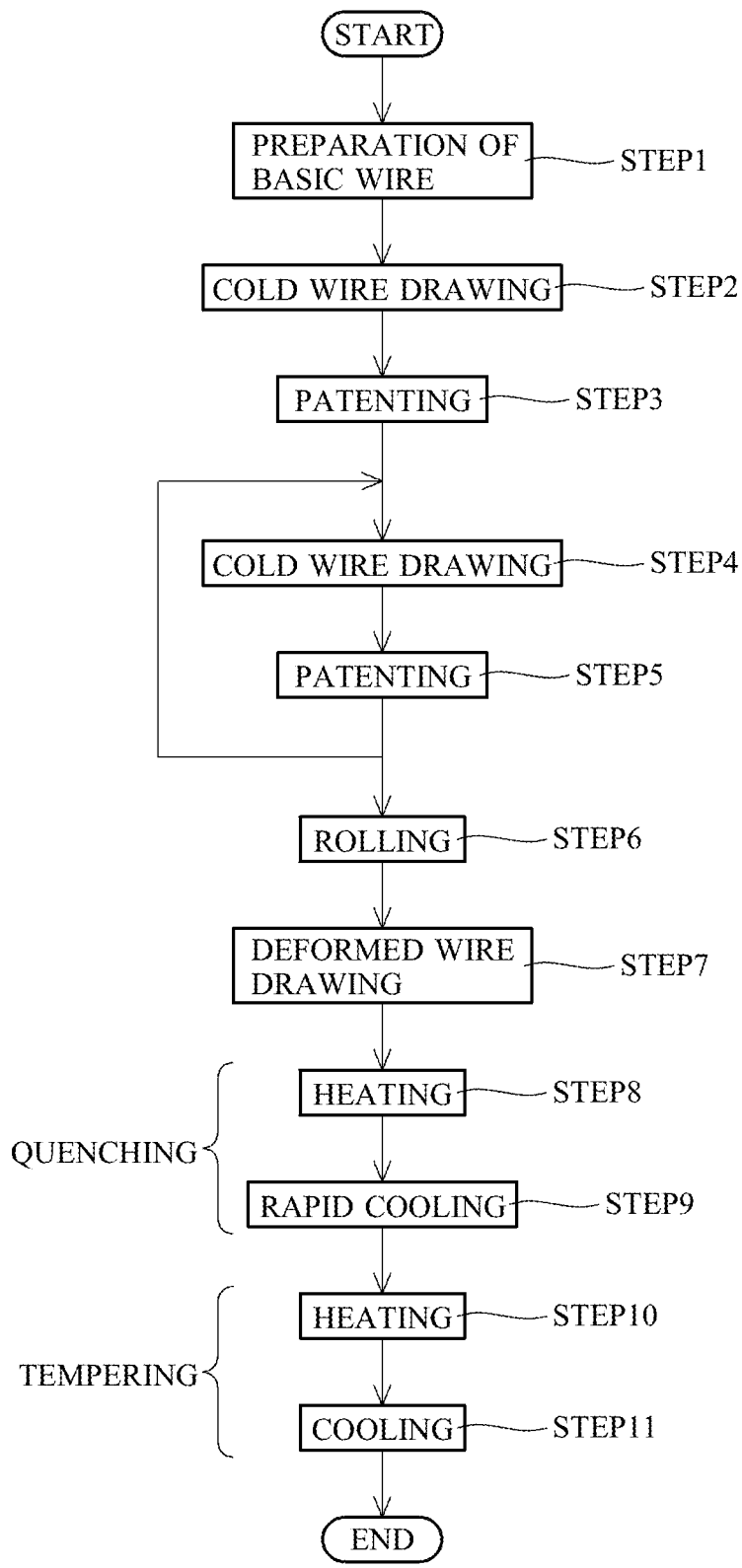
FIG. 3 is a flowchart showing an example of a method of producing the oil ring wire of FIG. 1.

FIG. 3 is a flowchart showing an example of a method of producing the oil ring wire 2 of FIG. 1. In the production method, a basic wire is prepared first (STEP 1). The basic wire is obtained through processes such as steelmaking, refining, casting, hot rolling, and annealing. The cross-sectional shape of the basic wire is a circle. The diameter of the circle is, for example, 6.4 mm.

The wire is subjected to cold wire drawing (STEP 2). In the cold wire drawing, the basic wire gradually decreases in diameter and gradually increases in length. The cross-sectional shape of the wire having undergone the cold wire drawing (STEP 2) is a circle. The diameter of the wire is, for example, 4.0 mm.

The wire is subjected to patenting (STEP 3). The patenting is a heat treatment in which the wire heated into the austenitic region is cooled to give a pearlitic microstructure. The patenting restores the ductility of the wire which was diminished by the cold wire drawing (STEP 2).

The wire is further subjected to cold wire drawing (STEP 4). In the cold wire drawing, the wire gradually decreases in diameter and gradually increases in length. The cross-sectional shape of the wire having undergone the cold wire drawing (STEP 4) is a circle. The diameter of the wire is, for example, 2.0 mm.

The wire is subjected to patenting (STEP 5). The patenting restores the ductility of the wire which was diminished by the cold wire drawing (STEP 4). A thin wire is obtained by the above steps.

In the present embodiment, cold wire drawing is performed twice. Cold drawing may be performed just once. In the present embodiment, patenting is performed twice. Patenting may be performed just once. The wire having undergone the second patenting (STEP 5) may be subjected to additional cold wire drawing and additional patenting to obtain a thin wire.

The thin wire is subjected to rolling as cold working (STEP 6). A deformed wire is obtained by the rolling. The cross-sectional shape of the deformed wire is not a circle. For example, the deformed wire has a thickness of 0.45 mm and a width of 2.1 mm.

The deformed wire is subjected to deformed wire drawing as cold working (STEP 7). The shape of the deformed wire is adjusted by the deformed wire drawing. For example, the deformed wire has a thickness of 0.40 mm and a width of 2.0 mm.

The deformed wire may be obtained by either the rolling (STEP 6) or the deformed wire drawing (STEP 7).

The deformed wire is subjected to quenching. In the quenching, the deformed wire is heated first (STEP 8). In the heating, the temperature of the deformed wire reaches the austenitic region. The deformed wire is then rapidly cooled (STEP 9). Preferably, the deformed wire is cooled in an oil. The deformed wire having undergone the quenching has a martensitic structure.

The deformed wire is subjected to tempering. In the tempering, the deformed wire is heated first (STEP 10). The deformed wire is then cooled (STEP 11). A structure with fine pieces of a precipitated carbide can be obtained by the tempering. The oil ring wire 2 shown in FIG. 1 is obtained by the tempering.

Figure 4:
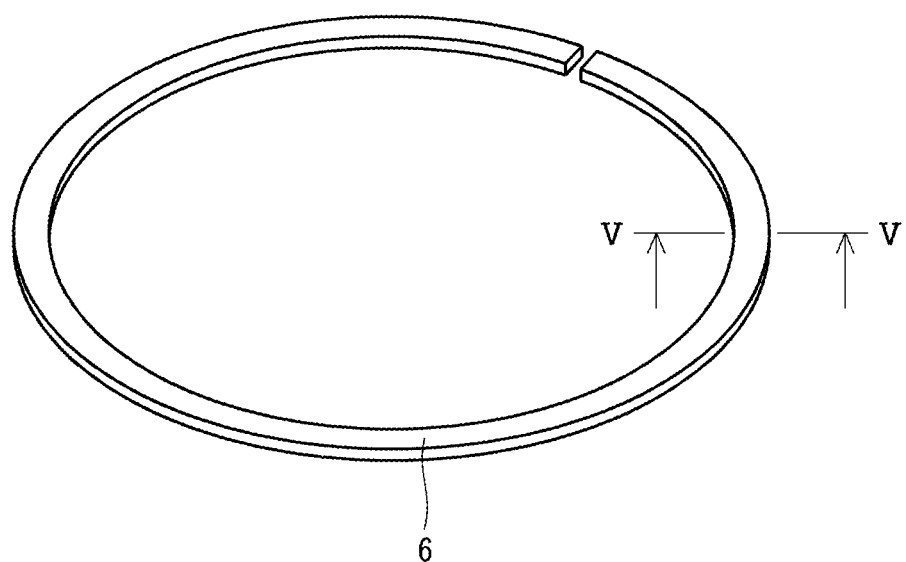
FIG. 4 is a perspective view showing a side rail obtained from the oil ring wire of FIG. 1.
Figure 5:
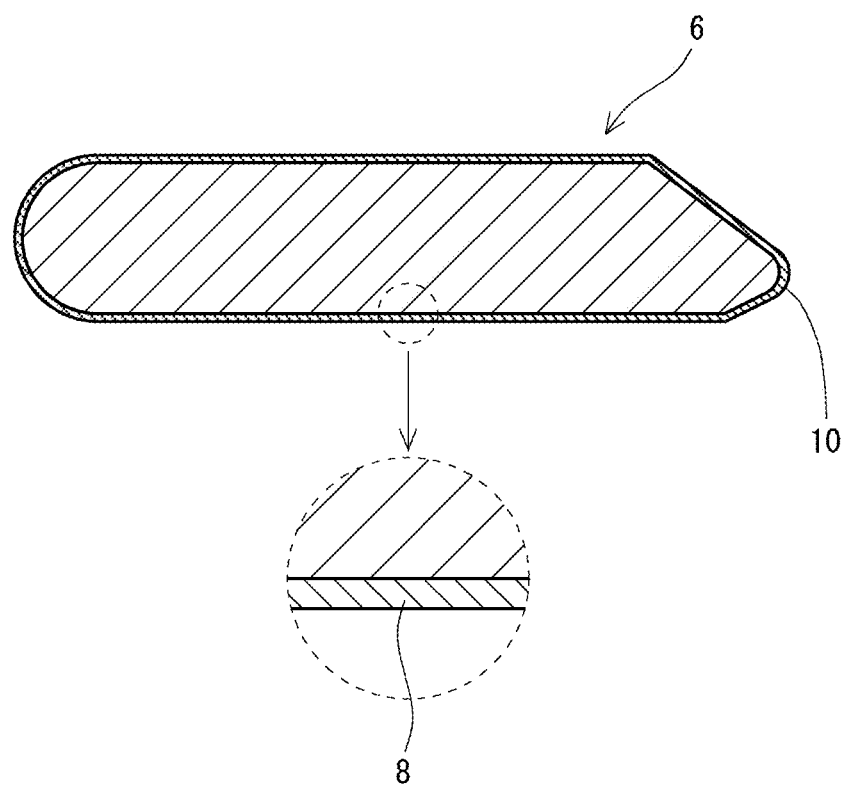
FIG. 5 is an enlarged cross-sectional view taken along the line V-V of FIG. 4.

The oil ring wire 2 is subjected to coiling to obtain a coil. The coil is subjected to a stress relief heat treatment. The coil is further subjected to nitriding. In the nitriding, the coil is held in an environment with a high temperature (e.g., 500° C.). A side rail 6 shown in FIGS. 4 and 5 is obtained by the nitriding. As shown in FIG. 5, the side rail 6 includes a hard layer 8 resulting from the nitriding and located in the vicinity of the surface of the side rail 6. The hard layer 8 extends over the entirety of the side rail 6. The hard layer 8 contains a nitride. Instead of the nitriding, means such as physical vapor deposition or ion plating may be used to form the hard layer 8. As shown in FIG. 5, the side rail 6 includes an outer circumferential face 10.

Figure 6:
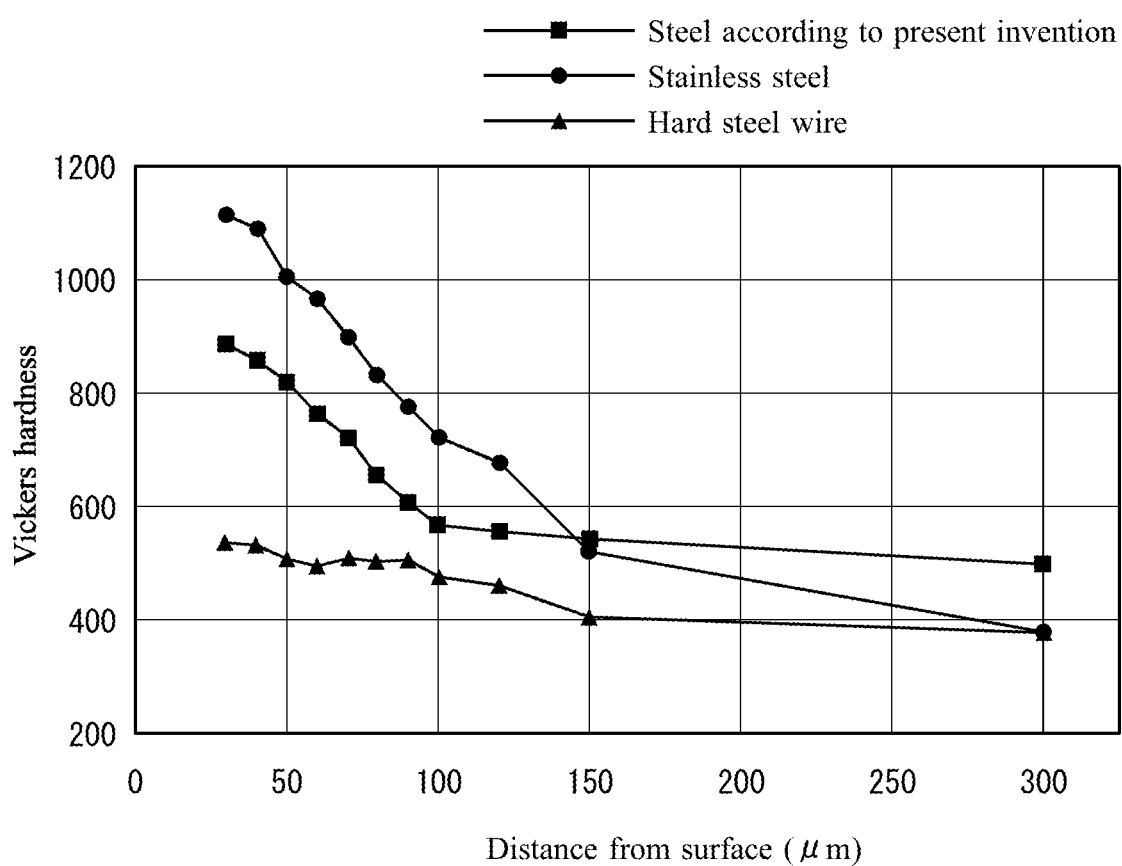
FIG. 6 is a graph showing the Vickers hardness of a nitrided layer of the side rail of FIG. 4.

FIG. 6 shows the relationship of Vickers hardness (load: 50 gf) versus depth from surface for the side rail 6 having undergone the nitriding. The Vickers hardness required of the side rail 6 is 700 or more. As is clear from the graph of FIG. 6, the side rail 6 obtained from the oil ring wire 2 according to the present invention exhibits a Vickers hardness of 700 or more in a region from a depth of zero to a depth of 70 μm. The oil ring wire 2 according to the present invention is more suitable for nitriding than low-alloy steels (such as hard steel wires).

Figure 7:
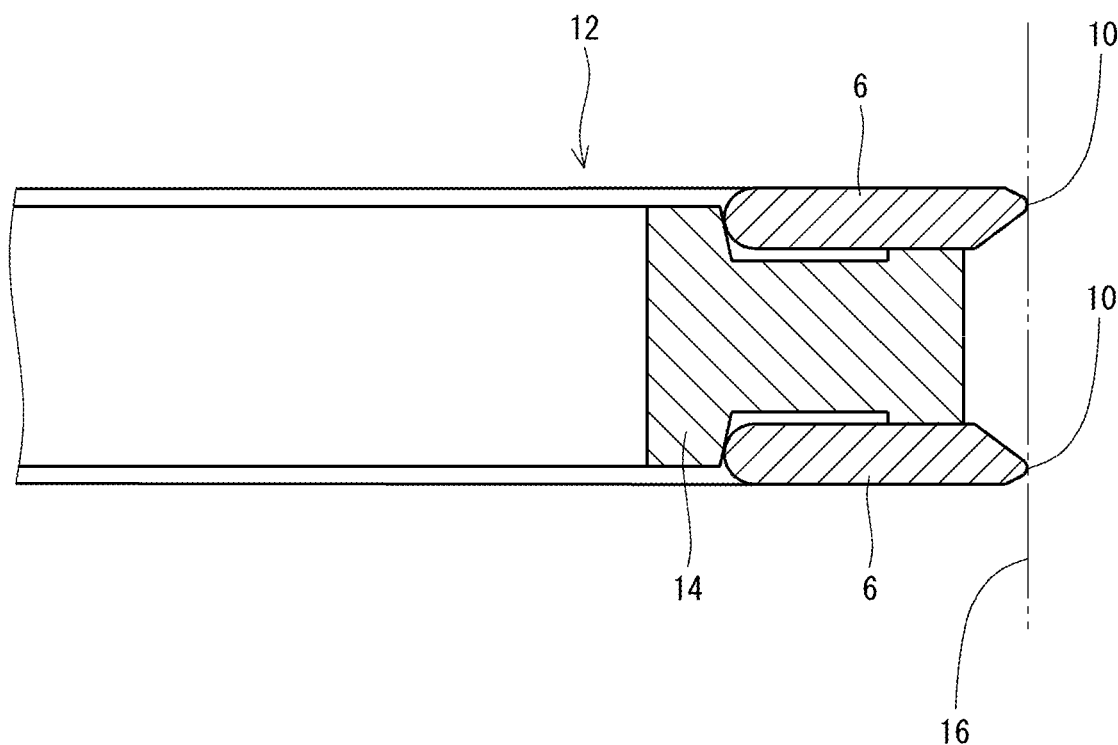
FIG. 7 is a cross-sectional view showing a part of an oil ring including the side rail of FIG. 4.

FIG. 7 is a cross-sectional view showing a part of an oil ring 12 including the side rail 6 of FIG. 4. The oil ring 12 includes a spacer expander 14 and a pair of side rails 6. The oil ring 12 is referred to as a three-piece combined oil ring. In FIG. 7, the reference sign 16 denotes the inner circumferential face of a cylinder. The outer circumferential face 10 of the side rail 6 is in contact with the inner circumferential face 16.

The outer circumferential face 10 of the side rail 6 shown in FIG. 5 reflects the shape of the edge portion 4 of the oil ring wire 2 shown in FIG. 2. As previously stated, the material of the oil ring wire 2 is a low-alloy steel. The low-alloy steel has excellent workability. Thus, the edge portion 4 can easily be formed by rolling (STEP 6) or deformed wire drawing (STEP 7). The side rail 6 obtained from the oil ring wire 2 need not be subjected to a cumbersome finishing process. The side rail 6 can be obtained from the oil ring wire 2 at a low cost.

In FIG. 2, the arrow R represents the radius of curvature of the edge portion 4 in a cross-section perpendicular to the longitudinal direction of the oil ring wire 2. The radius of curvature R is preferably 0.07 mm or less. The side rail 6 whose outer circumferential face 10 has a small radius of curvature can be obtained from the oil ring wire 2 whose edge portion 4 has a radius of curvature R of 0.07 mm or less. The side rail 6 exerts a high pressure on the inner circumferential face 16 of the cylinder when in contact with the inner circumferential face 16. The oil ring 12 including the side rail 6 scrapes off the oil satisfactorily. A basic wire made of a high-alloy steel is difficult to work into the oil ring wire 2 having a radius of curvature R of 0.07 mm or less by plastic forming. In the present invention, the material (i.e., a low-alloy steel) of the basic wire enables the basic wire to be worked into the oil ring wire 2 having a radius of curvature R of 0.07 mm or less.

As described in detail later, the alloy elements enable nitriding of the side rail 6. This eliminates the need for plating of the side rail 6. The side rail 6 can be obtained at a low cost.

In production of the oil ring wire 2, as previously stated, the wire ductility is diminished by cold wire drawing but restored by patenting. In the patenting, a large number of fine pieces of a carbide (cementite) are precipitated. The pieces of cementite are broken up by cold working. As a result of heating at a suitable temperature (STEP 8), the pieces of cementite fully form a solid solution with the matrix. Thus, the hardness of the deformed wire having undergone the quenching (STEP 8 and STEP 9) is high. In the tempering of the deformed wire having high hardness, heating at a high temperature (STEP 10) can be employed. When a coil formed from the oil ring wire 2 obtained through the tempering including high-temperature heating is subjected to a stress relief heat treatment, the hardness does not decrease significantly. In other words, the oil ring wire 2 has excellent softening resistance. The side rail 6 obtained from the oil ring wire 2 has high hardness. Thus, the side rail 6 has excellent wear resistance.

An area percentage Ps of a carbide in the oil ring wire 2 is negatively correlated with the amount of C involved in solid solution formation in the thin wire that has not yet undergone the rolling (STEP 6). The area percentage Ps is negatively correlated with the hardness of the deformed wire having undergone the quenching (STEP 8 and STEP 9). The area percentage Ps is negatively correlated also with the heating temperature employed in the tempering. Thus, the area percentage Ps is negatively correlated with the hardness of the side rail 6. In view of the wear resistance of the side rail 6, the area percentage Ps of a carbide in the oil ring wire 2 is preferably 1.00% or less, more preferably 0.90% or less, and particularly preferably 0.85% or less. The area percentage Ps is ideally zero.

The measurement of the area percentage Ps of a carbide is performed using image analysis software named "Image J". In the measurement, a cross-section of the oil ring wire 2 is imaged with a scanning electron microscope, and a SEM photograph is obtained at a magnification of 5000 times. An image file of the photograph is binarized by the above-mentioned image analysis software, and zones occupied by carbide particles are differentiated from other zones by color coding. The area of each of the carbide particles is calculated. A circle having the same area as the carbide particle of interest is assumed, and the diameter of the circle is determined as the diameter of the particle. The diameter and number of carbide particles having a diameter of 0.05 μm or more are sorted into a histogram. Carbide particles having a diameter of less than 0.05 μm are excluded from counting. The total area of the carbide particles having a diameter of 0.05 μm or more is calculated based on the histogram. The percentage of the total area to the area of the entire photograph is the area percentage Ps. In other words, the area percentage Ps is the percentage of an area occupied by a particulate carbide. The particulate carbide is a secondary carbide generated by heat treatments such as quenching and tempering. A lamellar carbide and an acicular carbide are not included in the particulate carbide.

The Vickers hardness Hv of the oil ring wire 2 is preferably 530 or more. The oil ring wire 2 can maintain sufficient hardness even after having been subjected to nitriding. The side rail 6 having excellent wear resistance can be obtained from the oil ring wire 2. In view of this fact, the Vickers hardness is more preferably 560 or more and particularly preferably 580 or more. In view of the ease of coiling, the Vickers hardness of the oil ring wire 2 is preferably 650 or less. The Vickers hardness is measured according to "JIS Z 2244". A load of 10 kgf is applied to the oil ring wire 2 in the measurement of the Vickers hardness.

As previously stated, cementite, which is a carbide, is precipitated in an alloy steel having undergone patenting. Quenching of the alloy steel (STEP 8 and STEP 9) causes the cementite to form a solid solution with the matrix. Tempering of the alloy steel (STEP 10 and STEP 11) leads to achievement of sufficient solid-solution strengthening and sufficient precipitation strengthening. These strengthening phenomena can lead to achievement of a Vickers hardness of 530 or more.

A conventional high-alloy steel able to undergo nitriding has a high Vickers hardness, which can give rise to break of the high-alloy steel during coiling. The low-alloy steel of the oil ring wire 2 according to the present invention has excellent workability despite being able to undergo nitriding. The oil ring wire 2 can have both a high Vickers hardness and high workability. The side rail 6 having excellent wear resistance can be obtained from the oil ring wire 2 at a low cost.

As previously stated, physical vapor deposition (PVD) may be employed instead of nitriding. The physical vapor deposition results in formation of a hard coat. The coat is formed around the outer circumferential face 10. The coat can reduce wear of the side rail 6 which arises from rubbing of the side rail 6 against the inner circumferential face 16 of the cylinder. No coat is formed on the rest of the surface of the side rail 6. A non-coated portion of the side rail 6 is placed in contact with the spacer expander 14. As previously stated, the side rail 6 has undergone a stress relief heat treatment. The side rail 6 has further undergone physical vapor deposition. Despite such a heat history, the side rail 6 has sufficient hardness since the oil ring wire 2 according to the present invention has excellent softening resistance. Thus, wear of the side rail 6 is reduced even though the non-coated portion is in contact with the spacer expander 14. Even if the internal combustion engine is used for a long period of time, the piston is less likely to suffer from movement abnormality due to wear of the side rail 6. The side rail 6 can contribute to reducing the oil consumption.

The following will describe in detail the roles of the elements contained in the low-alloy steel of the oil ring wire 2 according to the present invention.

[Carbon (C)]

C forms a solid solution with the matrix. A suitable amount of C contributes to the hardness and fatigue resistance of the oil ring wire 2. Additionally, the presence of C leads to formation of a carbide. The carbide contributes to the wear resistance of the oil ring wire 2. In view of these facts, the content of C is preferably 0.50% by mass or more, more preferably 0.53% by mass or more, and particularly preferably 0.55% by mass or more. Excess C diminishes the cold workability of the alloy steel. In view of the cold workability, the content of C is preferably 0.65% by mass or less.

[Silicon (Si)]

Si contributes to the high-temperature endurance and softening resistance of the oil ring wire 2. In view of this fact, the content of Si is preferably 1.60% by mass or more, more preferably 1.80% by mass or more, and particularly preferably 2.00% by mass or more. Excess Si diminishes the cold workability, toughness, and quenchability of the alloy steel. In view of this fact, the content of Si is preferably 2.30% by mass or less.

[Manganese (Mn)]

Mn functions as a deoxidizer during melting production of the low-alloy steel. Additionally, Mn reduces the adverse effect of S contained as an impurity. In view of these facts, the content of Mn is preferably 0.60% by mass or more, more preferably 0.80% by mass or more, and particularly preferably 0.90% by mass or more. In view of the cold workability of the alloy steel, the content of Mn is preferably 1.10% by mass or less.

[Chromium (Cr)]

Cr binds to nitrogen in nitriding. Cr enables nitriding of the oil ring wire 2. The hard layer 8 obtained as a result of nitriding contributes to the wear resistance of the side rail 6. Additionally, Cr binds to C to form a carbide. The carbide contributes to the wear resistance of the side rail 6. In view of these facts, the content of Cr is preferably 0.75% by mass or more, more preferably 0.85% by mass or more, and particularly preferably 0.90% by mass or more. Excess Cr impairs the cold workability of the alloy steel. Additionally, excess Cr can give rise to break of the oil ring wire 2 during coiling. In view of the cold workability and the prevention of break, the content of Cr is preferably 1.15% by mass or less.

[Nickel (Ni)]

Ni forms a solid solution with the matrix and contributes to the toughness of the oil ring wire 2. In view of this fact, the content of Ni is preferably 0.18% by mass or more, more preferably 0.25% by mass or more, and particularly preferably 0.30% by mass or more. Excess Ni leads to formation of retained austenite in the oil ring wire 2 having undergone quenching. The retained austenite can give rise to a low hardness of the side rail 6. Additionally, the retained austenite causes a change in the dimensions of the side rail 6 over time. In view of reducing the formation of retained austenite, the content of Ni is preferably 0.45% by mass or less.

[Vanadium (V)]

V binds to nitrogen in nitriding. V enables nitriding of the oil ring wire 2. The hard layer 8 obtained as a result of nitriding contributes to the wear resistance of the side rail 6. Additionally, V contributes to refinement of the metallographic structure. In view of these facts, the content of V is preferably 0.05% by mass or more, more preferably 0.08% by mass or more, and particularly preferably 0.10% by mass or more. In view of the cold workability and hot workability of the alloy steel, the content of V is preferably 0.15% by mass or less.

[Copper (Cu)]

Cu contributes to toughness during cold working. In view of this fact, the content of Cu is preferably 0.05% by mass or more, more preferably 0.08% by mass or more, and particularly preferably 0.10% by mass or more. In view of the hot workability of the alloy steel, the content of Cu is preferably 0.15% by mass or less. Cu is not an essential element. Thus, the content of Cu may be substantially zero.

[Iron (Fe)]

Fe is a major component of the low-alloy steel. Fe is a base metal of the matrix. The low-alloy steel has high strength and excellent toughness. The content of Fe is preferably 85% by mass or more, more preferably 90% by mass or more, and particularly preferably 93% by mass or more.

[Inevitable Impurities]

The low-alloy steel can contain impurities. A typical impurity is P. P segregates at the grain boundaries. P impairs the toughness of the alloy steel. In view of the toughness, the content of P is preferably 0.02% by mass or less. Another typical impurity is S. S binds to another element to form an inclusion. S impairs the toughness of the alloy steel. In view of the toughness, the content of S is preferably 0.02% by mass or less.

EXAMPLES

Hereinafter, the effect of the present invention will be demonstrated by examples. The present invention should not be restrictively interpreted based on the description of the examples.

Example 1

Figure 8:
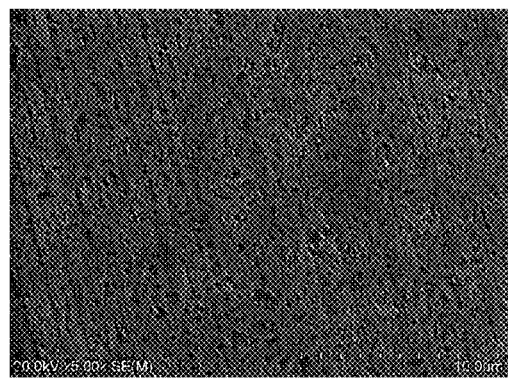
FIG. 8 is a microscope photograph showing the metallographic structure of an oil ring wire according to Example 1 of the present invention.

An oil ring wire of Example 1 was obtained by the method shown in FIG. 3. The heating temperature in the quenching was 860° C. The tempering temperature was adjusted as appropriate to give a preferred hardness. The material of the oil ring wire was a low-alloy steel. The low-alloy steel contained 0.59% by mass C, 2.05% by mass Si, 0.76% by mass Mn, 1.00% by mass Cr, 0.22% by mass Ni, 0.09% by mass V, and 0.01% by mass Cu. The rest of the low-alloy steel consisted of Fe and inevitable impurities. The metallographic structure of the oil ring wire is shown in FIG. 8. In the oil ring wire, the number of carbide particles was 88, the maximum diameter of the carbide particles was 0.29 μm, the average diameter of the carbide particles was 0.17 μm, and the area percentage Ps was 0.49%. The Vickers hardness (load: 10 kgf) of the oil ring wire was 592.

Example 2 and Comparative Example 1

Oil ring wires of Example 2 and Comparative Example 1 were obtained using quenching temperatures as shown in Table 1 below.

[Heat Treatment]

A coil was formed from each of the oil ring wires. The coil was held at a temperature of 450° C. for 30 minutes and then cooled slowly. The conditions of this heat treatment correspond to the conditions of a stress relief heat treatment which is commonly carried out in production of side rails. The Vickers hardness (load: 10 kgf) of the heat-treated coil was measured. The results are shown in Table 1 below.

TABLE 1

| | Evaluation results | | |
| --- | --- | --- | --- |
| | Ex. 1 | Ex. 2 | Comp. Ex. 1 |
| Quenching temperature (° C.) | 860 | 840 | 780 |
| Ps (%) | 0.49 | 0.96 | 1.13 |
| Hardness (Hv) | 592 | 595 | 587 |
| Hardness measured after heat treatment (Hv) | 557 | 537 | 422 |

The Vickers hardness required of side rails is 450 or more. As shown in Table 1, the Vickers hardness measured after the heat treatment was more than 450 for the oil ring wires according to Examples. The evaluation results demonstrate the superiority of the present invention.

INDUSTRIAL APPLICABILITY

The oil ring wire according to the present invention can be used as a material for piston rings of various internal combustion engines.

REFERENCE SIGNS LIST 2 oil ring wire
4 edge portion
6 side rail
8 hard layer
10 outer circumferential face
12 oil ring
14 spacer expander
16 inner circumferential face of cylinder

The invention claimed is:

1. An oil ring wire comprising an alloy steel as a material, wherein the alloy steel comprises:
   0.50 to 0.65% by mass C;
   1.60 to 2.30% by mass Si;
   0.60 to 1.10% by mass Mn;
   0.75 to 1.15% by mass Cr;
   0.18 to 0.45% by mass Ni;
   0.05 to 0.15% by mass V;
   0.15% by mass or less Cu; and
   inevitable impurities, and
   an area percentage of a carbide is 0.96% or less.

2. The oil ring wire according to claim 1, having a Vickers hardness of 530 to 650.

3. The oil ring wire according to claim 1, comprising a rounded edge portion, wherein
   the edge portion has a radius of curvature R of 0.07 mm in a cross-section perpendicular to a longitudinal direction of the oil ring wire.

4. A method of producing the oil ring wire according to claim 1, the method comprising:
   (1) subjecting a basic wire to cold wire drawing and patenting to obtain a thin wire, the basic wire comprising an alloy steel as a material, the alloy steel comprising 0.50 to 0.65% by mass C, 1.60 to 2.30% by mass Si, 0.60 to 1.10% by mass Mn, 0.75 to 1.15% by mass Cr, 0.18 to 0.45% by mass Ni, 0.05 to 0.15% by mass V, 0.15% by mass or less Cu, and inevitable impurities;
   (2) subjecting the thin wire to rolling or deformed wire drawing as cold working to obtain a deformed wire; and
   (3) subjecting the deformed wire to quenching and tempering.

* * * * *